(12) United States Patent
Van Hoek

(10) Patent No.: US 8,820,852 B2
(45) Date of Patent: Sep. 2, 2014

(54) SPROCKET MOUNTING CARRIER FOR A BICYCLE

(76) Inventor: Robertus Cornelius Wilhelmus Van Hoek, Vlijmen (NL)

( * ) Notice: Subject to any disclaimer, the term of this patent is extended or adjusted under 35 U.S.C. 154(b) by 0 days.

(21) Appl. No.: 13/550,978

(22) Filed: Jul. 17, 2012

(65) Prior Publication Data
US 2013/0184109 A1    Jul. 18, 2013

Related U.S. Application Data

(63) Continuation of application No. PCT/NL2011/050040, filed on Jan. 21, 2011.

(30) Foreign Application Priority Data

Jan. 21, 2010  (NL) .................................... 2004127

(51) Int. Cl.
*B60B 27/04* (2006.01)
*B62M 9/10* (2006.01)

(52) U.S. Cl.
USPC ........................................ 301/110.5; 474/160

(58) Field of Classification Search
USPC ........... 301/110.5; 192/64; 474/152, 160, 164
See application file for complete search history.

(56) References Cited

U.S. PATENT DOCUMENTS

| | | | | |
|---|---|---|---|---|
| 5,480,357 | A * | 1/1996 | Liang | 474/77 |
| 6,866,604 | B2 * | 3/2005 | Kamada et al. | 474/160 |
| 7,846,047 | B2 * | 12/2010 | Nakano et al. | 474/152 |
| 2004/0142782 | A1 * | 7/2004 | Kamada et al. | 474/160 |
| 2006/0014599 | A1 * | 1/2006 | Meggiolan | 474/152 |
| 2010/0260544 | A1 * | 10/2010 | Chiang | 403/359.1 |

FOREIGN PATENT DOCUMENTS

| | | |
|---|---|---|
| DE | 202009006385 | 8/2009 |
| EP | 1616781 | 1/2006 |

* cited by examiner

*Primary Examiner* — Kip T Kotter
(74) *Attorney, Agent, or Firm* — Eric Karich

(57) ABSTRACT

A sprocket mounting carrier has a cylindrical body which on the outside is provided with grooves extending in axial direction. The sprocket mounting carrier has such a shape that both sprockets of a first type and sprockets of a second type can be slid onto it. These sprockets each have a central hole whose bounding wall has cams. The bottoms and side walls of the grooves of the sprocket mounting carrier, in the event of sprockets being present on the sprocket mounting carrier, engage with the cams of the sprockets, so that the sprockets are secured to the sprocket mounting carrier both in radial direction and in tangential direction.

3 Claims, 3 Drawing Sheets

SPROCKET MOUNTING CARRIER FOR A BICYCLE

CROSS-REFERENCE TO RELATED APPLICATIONS

This application for a utility patent is a continuation of a previously filed utility patent, having the application number PCT/NL2011/050040, filed Jan. 21, 2011 (Publication No. WO 2011/090383).

BACKGROUND OF THE INVENTION

1. Field of the Invention

The present invention relates to a sprocket mounting carrier for a bicycle.

2. Description

This invention relates to a sprocket mounting carrier for a bicycle for carrying a first sprocket having a central hole of which the bounding wall has at least four first cams whose tops are the first cams innermost curved surfaces having a first top diameter. The sprocket mounting carrier has a cylindrical body having an outside with an outside diameter and at least four first grooves in the outside of the cylindrical body, the at least four first grooves having bottoms, which are the innermost curved surfaces of the first grooves, wherein the bottoms have a first bottom diameter whereby the first cams engage with the first grooves and/or the bounding wall engages with the outside, so that the first sprocket both in the radial direction and in at least one tangential direction cannot move relative to the sprocket mounting carrier. Furthermore, the sprocket mounting carrier has second sprockets that have a further central hole having a bounding wall with at least six second cams projecting radially inward, where the tops of the second cams are the innermost curved surface of the second cams, and have a second top diameter. The outside of the cylindrical body has at least five second grooves having bottoms, which are the innermost curved surfaces of the second grooves. The bottoms have a second bottom diameter, wherein the first bottom diameter is smaller than the second bottom diameter. The second grooves engage with the second cams, and/or the bounding wall of the further central hole engages with the outside so that the second sprocket both in the radial direction and in at least one tangential direction cannot move or can hardly move relative to the sprocket mounting carrier.

Engagement in this respect is to be understood to mean that at least a plurality of the cams are in contact with the bounding walls of the grooves. After being mounted, the tops and the side walls of the cams are in contact with or have a close fit gap to the grooves due to manufacturing tolerances. During operation this clearance will often be neutralized because the sprockets will transfer the torque produced via the chain to the sprocket mounting carrier. The side walls of the cams then come into contact with the side walls of the grooves. During the mounting of the sprocket on the sprocket mounting carrier usually one or two of the cams will hit with their tops against the bottoms of the grooves, for example as a result of gravity. The other cams are then positioned at a slight distance from the bottoms of the cams. As a result, the cams are captured by the grooves of the sprocket mounting carrier and thus rotate together.

STATE OF THE ART

A sprocket mounting carrier of this type is known from EP-A-1 721 823 (Shimano). This known sprocket mounting carrier is designed for carrying sprockets that have a bounding wall that closely fits around the sprocket mounting carrier. These sprockets are also known from this patent application. In addition to this known sprocket applied most there is another much applied sprocket available with another shape of the bounding wall of the central hole known from U.S. Pat. No. 5,782,712 (Campagnolo). The latter sprocket does not fit on the known sprocket mounting carrier mentioned above, but another sprocket mounting carrier has been designed for this to which the aforementioned sprockets in their turn do not fit. As a result, sprocket mounting carriers of one type as well as sprocket mounting carriers of the other type are currently used and bicycle shops, bicycle repair shops, wholesale businesses etc. are to be stockists of both types of sprocket mounting carriers.

SUMMARY OF THE INVENTION

This invention relates to a sprocket mounting carrier for a bicycle for carrying a first sprocket having a central hole of which the bounding wall has at least four first cams whose tops are the first cams innermost curved surfaces having a first top diameter. The sprocket mounting carrier has a cylindrical body having an outside with an outside diameter and at least four first grooves in the outside of the cylindrical body, the at least four first grooves having bottoms, which are the innermost curved surfaces of the first grooves, wherein the bottoms have a first bottom diameter whereby the first cams engage with the first grooves and/or the bounding wall engages with the outside, so that the first sprocket both in the radial direction and in at least one tangential direction cannot move relative to the sprocket mounting carrier. Furthermore, the sprocket mounting carrier has second sprockets that have a further central hole having a bounding wall with at least six second cams projecting radially inward, where the tops of the second cams are the innermost curved surface of the second cams, and have a second top diameter. The outside of the cylindrical body has at least five second grooves having bottoms, which are the innermost curved surfaces of the second grooves. The bottoms have a second bottom diameter, wherein the first bottom diameter is smaller than the second bottom diameter. The second grooves engage with the second cams, and/or the bounding wall of the further central hole engages with the outside so that the second sprocket both in the radial direction and in at least one tangential direction cannot move or can hardly move relative to the sprocket mounting carrier.

Another embodiment may have the outside of the cylindrical body with at least eight second grooves.

Another embodiment may have the first sprocket comprise at least one boss positioned to engage one of the first cams, the boss having a top which is the innermost curved surface of the boss, wherein the top has a third top diameter which is larger than the first top diameter and smaller than the second top diameter. There may also be a recess having a bottom, which is the innermost curved surface of the recess, and the recess having a third bottom diameter which is larger than the first bottom diameter and smaller than the second bottom diameter and is equal to or smaller than the third top diameter.

BRIEF DESCRIPTION OF THE DRAWINGS

The invention will be elucidated more fully below based on an example of embodiment of the sprocket mounting carrier according to the invention while reference is made to the appended drawing figures, in which.

DETAILED DESCRIPTION OF THE INVENTION

As used in the present application, the terms "diameter" and "circle" are hereby intended to refer to an imaginary "circle" having a "diameter" that corresponds to the radius of curvature which is present on many elements in the present application. Unless otherwise stated, the center of the "circle," "diameter," and the corresponding radius of curvature, is the center of the invention as shown by the center-line in FIG. 2 and by the intersection of the axis lines in FIGS. 5 and 6.

Also, as used in the present application, the terms "tops," "bottoms," and "bounding walls" generally refer to surfaces at a fixed radius, which span an azimuthal angle, and are the outer surface of a cam, or the inner surface of a groove. "Walls" or "side walls" are surfaces of cams or grooves that are generally radial in orientation, though some minor deviation from a strictly radial orientation may be present.

Figure 1:
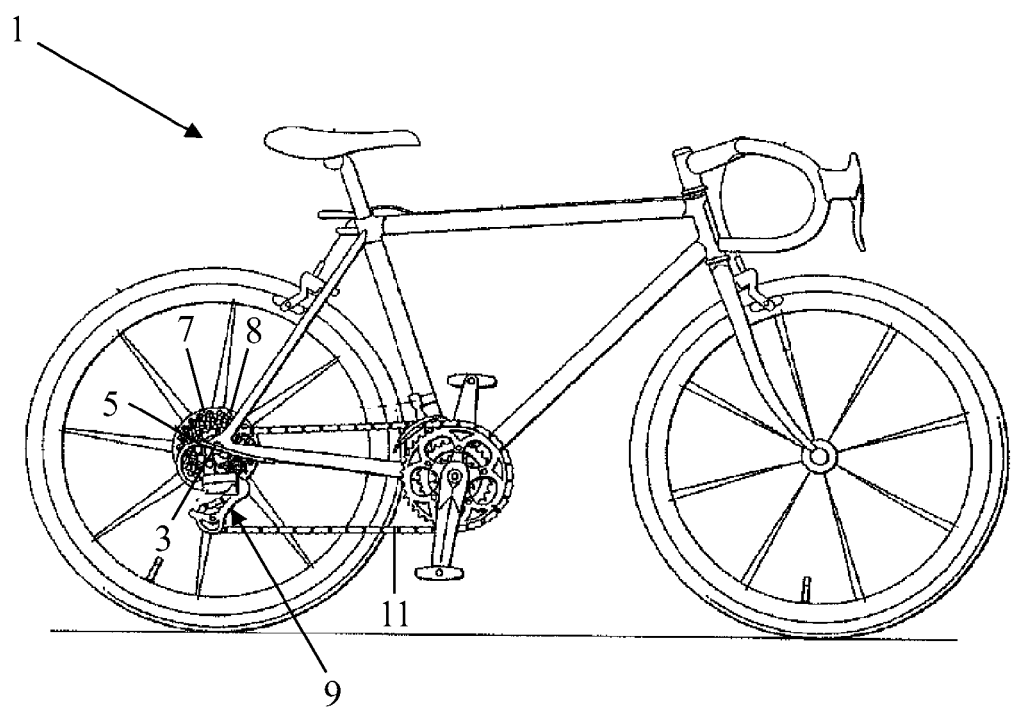
FIG. 1 shows a bicycle comprising a sprocket mounting carrier according to one embodiment of the invention.
Figure 2:
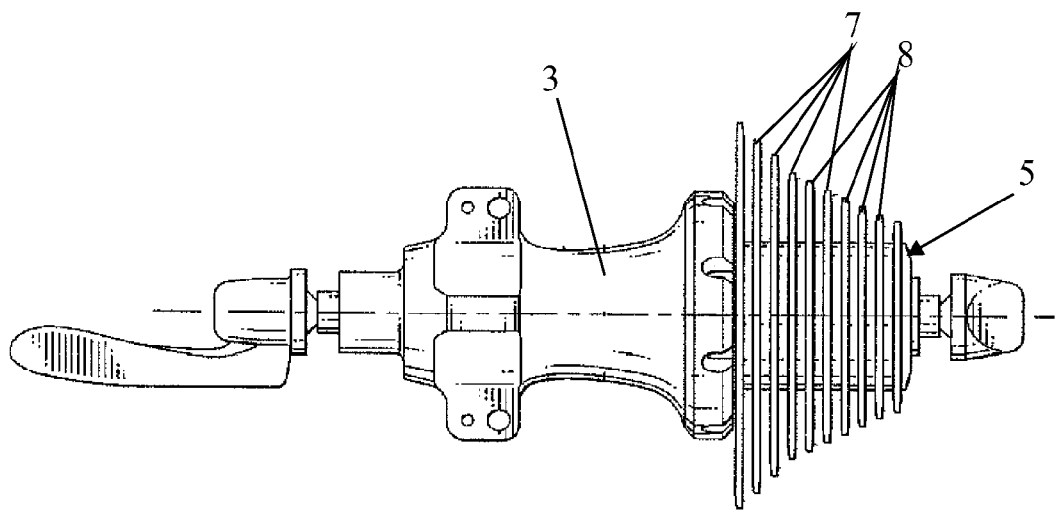
FIG. 2 shows a rear axle of a bicycle with the attached sprocket mounting carrier and mounted sprockets.

FIG. 1 shows a bicycle 1 comprising a sprocket mounting carrier 5 according to one embodiment of the invention. FIG. 2 shows a rear hub 3 of a bicycle 1 with the attached sprocket mounting carrier 5 and mounted sprockets;

As shown in FIGS. 1-2, the bicycle 1 has the rear hub 3 with a sprocket mounting carrier 5 attached to it, the sprocket mounting carrier 5 having sprockets 7 of a first type and sprockets 8 of a second type. The bicycle 1 furthermore includes a derailleur 9 by which the bicycle chain 11 can be moved from one sprocket to the other sprocket to change the gear ratio of the bicycle.

Figure 3:
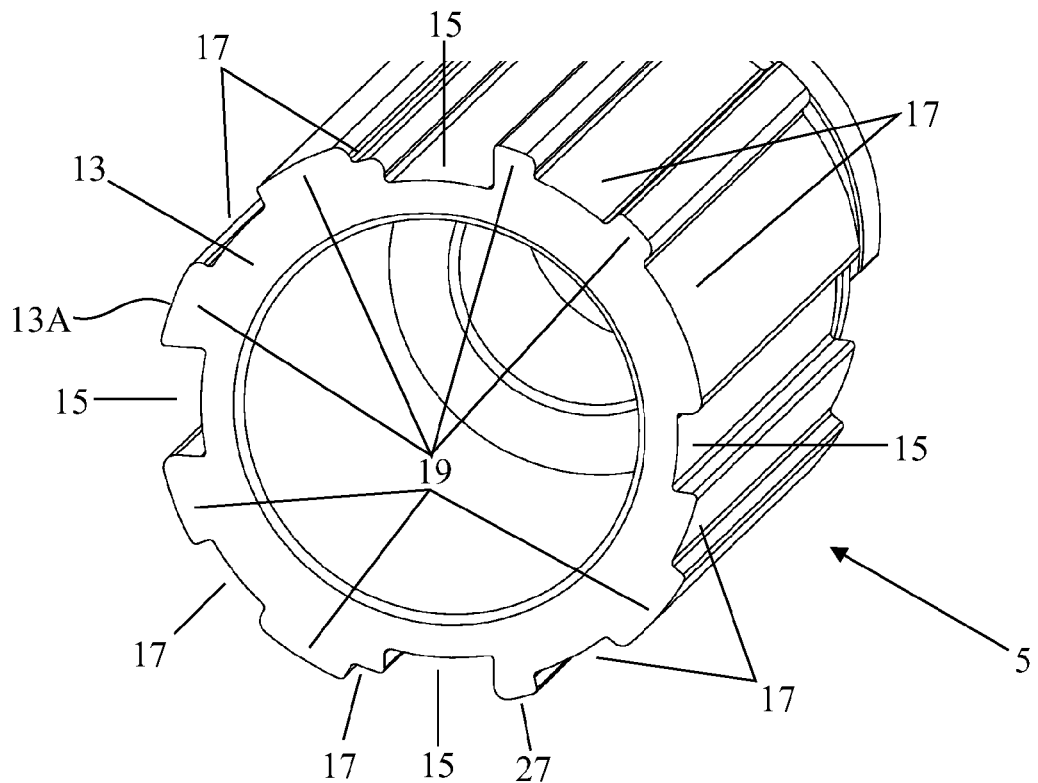
FIG. 3 shows a perspective view of the sprocket mounting carrier.
Figure 4:
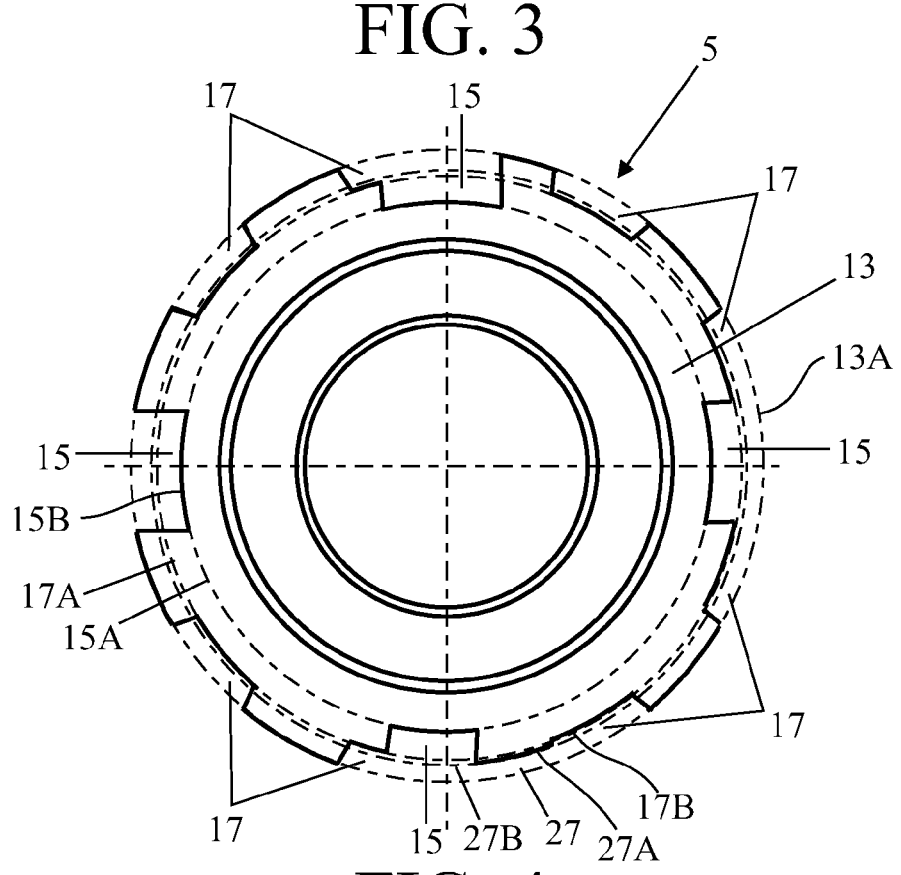
FIG. 4 shows a cross-sectional view of the sprocket mounting carrier shown in FIG. 3.

FIG. 3 shows a perspective view of the sprocket mounting carrier 5. FIG. 4 shows a cross-sectional view of the sprocket mounting carrier 5 shown in FIG. 3.

Figure 5:
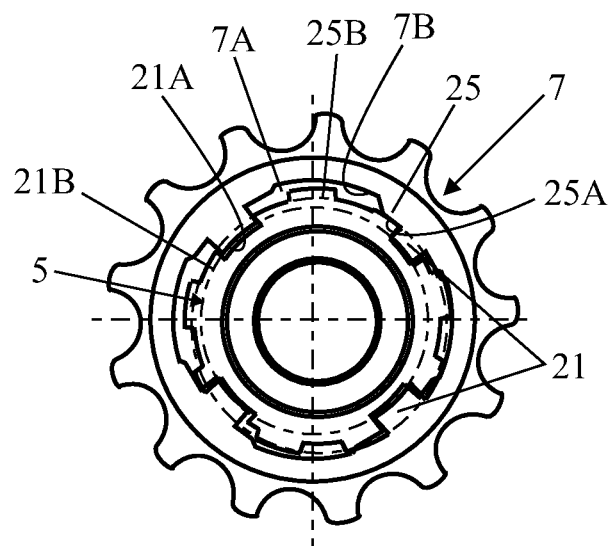
FIG. 5 shows a sprocket of the first type present on the sprocket mounting carrier according to the invention.
Figure 6:
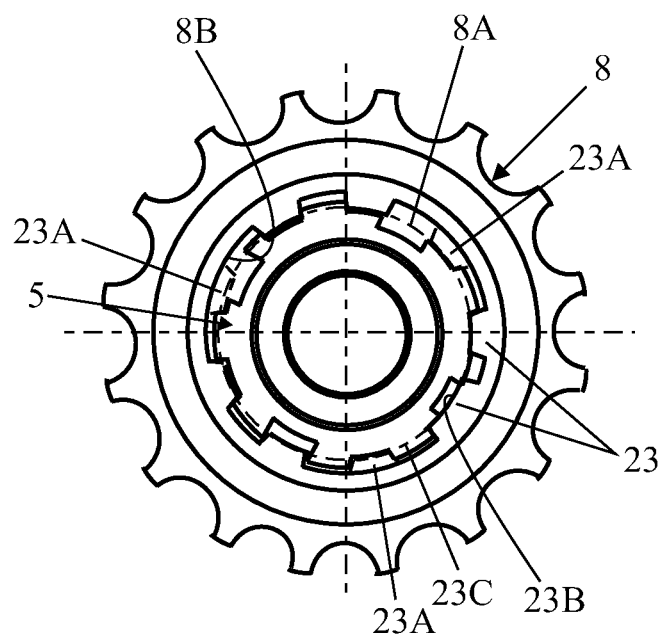
FIG. 6 shows a sprocket of the second type present on the sprocket mounting carrier according to the invention.

The cross-section of the sprocket mounting carrier 5, may be shaped such that both sprocket 7, see FIG. 5, and sprocket 8, see FIG. 6, may be slid onto it. The sprocket mounting carrier 5 comprises a cylindrical body 13, an outside 13A (outer surface), and on the inner surface may have one or more first grooves 15, one or more second grooves 17, and one or more ribs 19. Each of the first grooves 15 may have a bottom 15B which is a curved surface with a radius of curvature corresponding to a circle having a first bottom diameter 15A, centered on the central axis of the sprocket mounting carrier 5.

Similarly, each of the second grooves 17 may have a bottom 17B which is a curved surface with a radius of curvature corresponding to a circle having a second bottom diameter 17A, centered on the central axis of the sprocket mounting carrier 5. However, in the present embodiment, the first bottom diameter 15A is smaller than the second bottom diameter 17A.

The ribs 19 are the parts of the cylindrical body 13 which serve to define the first grooves 15 and the second grooves 17.

FIG. 5 shows a sprocket 7 of the first type present on the sprocket mounting carrier 5 according to the invention. FIG. 6 shows a sprocket 8 of the second type present on the sprocket mounting carrier 5 according to the invention. Sprocket 7 has a central hole 7A, and a bounding wall 7B. The bounding wall 7B is the curved outermost surface of the central hole 7A. Furthermore, sprocket 7 may have cams 21 extending radially inward. The cams 21 may each have a top 21A which is a curved surface with a radius of curvature corresponding to a circle with a first top diameter 21B, centered on the central axis of the sprocket mounting carrier 5.

Sprocket 8 is similar to sprocket 7, having a central hole 8A and a bounding wall 8B. The bounding wall 8B is the curved outermost surface of the central hole 8A. Also, sprocket 8 may have cams 23 extending radially inward. The cams 23 may have tops 23B which are curved surfaces with a radius of curvature corresponding to a circle having a second top diameter 23C, centered on the central axis of the sprocket mounting carrier 5.

The bounding walls of the holes 7A and 8A in the sprockets 7 and 8 may be different from each other in that, if the sprockets are concentrically aligned, the cams 21 do not fully overlap the cams 23.

The first grooves 15 of the sprocket mounting carrier 5 may have side walls which are the radially oriented parts of the first grooves 15. The first grooves 15 may engage with the cams 21 of the sprocket 7, such that the cams 21 are captured by the first grooves 15 causing them to rotate together and have very little relative movement in the radial direction, due to the close fit, or azimuthal directions because of the side walls pressing against the cams 21.

Sprocket 8 is similar in that the cams 23 are captured by the second grooves 17, causing the sprocket 8 to rotate with the sprocket mounting carrier 5.

The shape of the cross section of the sprocket mounting carrier 5 (see FIG. 4) may be determined by putting the sprockets 7 and sprockets 8 concentrically aligned, thus the shapes of the central hole 7A and the central hole 8A form the shape of the outside 13A of the sprocket mounting carrier 5. The sprockets 7 and sprockets 8 may be turned relative to each other, so that different shapes of the sprocket mounting carrier 5 are possible. The preferred embodiments of the sprocket mounting carrier 5 may be obtained aligning the sprockets 7 and sprockets 8 in such a way that as many parts of the side walls of the cams 21 and the cams 23 form the shape of the outer surface of the sprocket mounting carrier 5.

The shape of the sprocket mounting carrier 5 may be such that at least the sprocket having the largest diameter circle, as part of its inner surface, is centered with the tops of its cams on the sprocket mounting carrier 5. Preferably, the tops of the cams 21A of the cams 21, or the tops of the cams 23B of the cams 23, are in contact (i.e. are centered) with the sprocket mounting carrier 5. For example, that the tops of the cams 23 of the sprocket 8 are in contact (i.e. are centered) with the carrier 5.

Preferably, also the sprocket having the smallest diameter central hole is centered with the tops of its cams on the sprocket mounting carrier 5. The latter, however, is not necessary; the sprocket having the smallest diameter circle may also be centred on the outside 13A of the cylindrical body 13 of the sprocket mounting carrier 5. This means that instead of the sprocket 7 being with the tops 21A of its cams 21 in contact with the sprocket mounting carrier 5, that it is also possible that the outside 13A of the cylindrical body 13 of the sprocket mounting carrier 5 is in contact with the bounding wall 7B in the sprocket 7.

The second sprocket 8 may also have nine cams 23, so in addition to the six cams 23 already present there are three extra cams 23A. In this embodiment, the sprocket mounting carrier 5 should accommodate at least eight of the second grooves 17 in the outside 13A of the cylindrical body 13.

The first sprockets 7 may have a boss 25 which may be located adjacent one of the first cams 21. The top 25A of the boss 25 may be a curved surface with a radius of curvature corresponding to a circle having a third top diameter 25B, centered on the central axis of the sprocket mounting carrier 5. In the present embodiment, the third top diameter 25B may be larger than the first top diameter 21B and smaller than the second top diameter 23C.

There may be a recess 27 adjacent one of the first grooves 15 and arranged as a continuation of this first groove 15. The recess 27 may have a bottom 27A, which is the innermost curved surface of the recess 27, with a radius of curvature corresponding to a circle having a third bottom diameter 27B which is larger than the first bottom diameter 15A and smaller than the second bottom diameter 17A and which is equal or slightly smaller than the third top diameter 25B. The recess 27 is best illustrated in FIG. 4, where the recess 27 is the open space near the bottom of FIG. 4 and between the third bottom diameter 27B and the diameter of the outside 13A.

Albeit the invention has been described in the foregoing with reference to the drawings, it should be pointed out that the invention is not by any manner or means restricted to the embodiments shown in the drawings. The invention also extends over any embodiment deviating from the embodiment shown in the drawing figures within the spirit and scope defined by the claims.

What is claimed is:

1. A sprocket mounting carrier assembly for a bicycle for carrying a first sprocket having a central hole with a bounding wall that has at least four first cams, the at least four first cams having tops defining innermost curved surfaces of the at least four first cams, the innermost curved surfaces having a first top diameter, the sprocket mounting carrier assembly comprising:
    a sprocket mounting carrier having a cylindrical body having an outside with an outside diameter;
    at least four first grooves in the outside of the cylindrical body, the at least four first grooves having bottoms, defining innermost curved surfaces of the at least four first grooves, wherein the bottoms have a first bottom diameter whereby the first cams engage with the first grooves and/or the bounding wall engages with the outside, so that the first sprocket both in the radial direction and in at least one tangential direction cannot move relative to the sprocket mounting carrier;
    a second sprocket being mounted on the sprocket mounting carrier, the second sprocket having a further central hole having a bounding wall with at least six second cams projecting radially inward;
    wherein the at least six second cams having tops defining innermost curved surfaces of the at least six second cams, the tops of the at least six second cams each having a second top diameter;
    wherein the outside of the cylindrical body has at least five second grooves having bottoms, defining innermost curved surfaces of the at least five second grooves, wherein the bottoms have a second bottom diameter, wherein the first bottom diameter is smaller than the second bottom diameter; and
    wherein second grooves engage with the second cams, and/or the bounding wall of the further central hole engages with the outside so that the second sprocket both in the radial direction and in at least one tangential direction is captured by the sprocket mounting carrier causing them to rotate together.

2. A sprocket mounting carrier assembly as claimed in claim 1, wherein the outside of the cylindrical body has at least eight second grooves.

3. A sprocket mounting carrier assembly as claimed in claim 1, wherein the first sprocket comprise at least one boss operatively positioned to engage one of the first cams, the boss having a top which is an innermost curved surface of the boss, wherein the top has a third top diameter which is larger than the first top diameter and smaller than the second top diameter;
    wherein there is a recess having a bottom, which is an innermost curved surface of the recess, and the recess having a third bottom diameter which is larger than the first bottom diameter and smaller than the second bottom diameter and is equal to or smaller than the third top diameter.

* * * * *